(12) United States Patent
Hirose

(10) Patent No.: US 9,483,010 B2
(45) Date of Patent: Nov. 1, 2016

(54) GEAR APPARATUS HAVING REINFORCING MEMBER AND IMAGE FORMING APPARATUS

(71) Applicant: SAMSUNG ELECTRONICS CO., LTD., Suwon-si (KR)

(72) Inventor: Yuichi Hirose, Kanagawa (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/736,627

(22) Filed: Jun. 11, 2015

(65) Prior Publication Data

US 2016/0062299 A1     Mar. 3, 2016

(30) Foreign Application Priority Data

Sep. 3, 2014    (JP) ................................. 2014-179446
Jan. 30, 2015    (KR) ........................ 10-2015-0015586

(51) Int. Cl.
| | | |
|---|---|---|
| *G03G 15/00* | (2006.01) | |
| *F16H 55/00* | (2006.01) | |
| *F16H 57/00* | (2012.01) | |
| *F16H 55/17* | (2006.01) | |
| *F16H 1/00* | (2006.01) | |
| *G03G 15/16* | (2006.01) | |
| *G03G 21/16* | (2006.01) | |

(52) U.S. Cl.
CPC .............. *G03G 15/757* (2013.01); *F16H 1/00* (2013.01); *F16H 55/00* (2013.01); *F16H 55/17* (2013.01); *F16H 57/0025* (2013.01); *G03G 15/1615* (2013.01); *G03G 21/1647* (2013.01); *G03G 2221/1657* (2013.01)

(58) Field of Classification Search
CPC ..................... G03G 15/0935; G03G 15/0806; G03G 15/757; G03G 15/1615; G03G 21/1647; G03G 2221/1657; F16H 55/17; F16H 57/0025; F16H 1/00; F16H 57/0031; F16H 57/0037; F16H 2055/065
USPC ....... 399/167, 267, 279, 297, 302, 303, 308; 74/445, 640, 434

See application file for complete search history.

(56) References Cited

U.S. PATENT DOCUMENTS

| | | | |
|---|---|---|---|
| 4,902,162 A * | 2/1990 | Watt ...................... | F16D 1/0894 403/318 |
| 2002/0029648 A1* | 3/2002 | Noguchi ................ | F16H 55/17 74/461 |

(Continued)

FOREIGN PATENT DOCUMENTS

| | | |
|---|---|---|
| EP | 0622699 A2 | 11/1994 |
| GB | 1363151 A | 8/1974 |

(Continued)

OTHER PUBLICATIONS

Communication dated Feb. 8, 2016, issued by the European Patent Office in counterpart European Application No. 15173881.2.

*Primary Examiner* — Robert Beatty
(74) *Attorney, Agent, or Firm* — Staas & Halsey LLP

(57) ABSTRACT

A gear apparatus includes a gear including a shaft hole, a reinforcing member that has a higher stiffness in comparison to the gear, and a rotation shaft that is inserted into the shaft hole through the reinforcing member. The gear and the reinforcing member are connected such that they rotate together, by a first connecting portion provided outside of the shaft hole. In this example, the reinforcing member and the rotation shaft are connected to rotate together, by a second connecting portion.

13 Claims, 10 Drawing Sheets

(56) References Cited

U.S. PATENT DOCUMENTS

| | | | |
|---|---|---|---|
| 2004/0194566 A1* | 10/2004 | Takayama | F16H 57/0025 74/434 |
| 2015/0117918 A1* | 4/2015 | Suzuki | G03G 15/757 399/320 |
| 2015/0308555 A1* | 10/2015 | Oberle | F16H 55/06 74/421 R |

FOREIGN PATENT DOCUMENTS

| | | | | |
|---|---|---|---|---|
| JP | 08074971 A | * | 3/1996 | |
| JP | 10161474 A | * | 6/1998 | |
| JP | 11125325 A | * | 5/1999 | |
| JP | 11156886 A | * | 6/1999 | |
| JP | 2003-36007 A | | 2/2003 | |
| JP | 2006-342823 A | | 12/2006 | |
| JP | 2006342823 A | * | 12/2006 | |
| JP | 2008-14438 A | | 1/2008 | |
| JP | 2008014438 A | * | 1/2008 | |
| JP | 2008268249 A | * | 11/2008 | |
| JP | 2009103205 A | * | 5/2009 | |
| JP | 2010-196728 A | | 9/2010 | |
| JP | 2010196728 A | * | 9/2010 | |
| JP | 2012-97760 A | | 5/2012 | |

\* cited by examiner

GEAR APPARATUS HAVING REINFORCING MEMBER AND IMAGE FORMING APPARATUS

CROSS-REFERENCE TO RELATED APPLICATION(S)

This application claims priority from Japanese Patent Application No. 2014-179446, filed on Sep. 3, 2014, in the Japanese Patent Office, and Korean Patent Application No. 10-2015-0015586, filed on Jan. 30, 2015, in the Korean Intellectual Property Office, the disclosures of which are each incorporated herein in their entireties by reference.

BACKGROUND

1. Field

Apparatuses and methods consistent with the exemplary embodiments provided herein relate to a gear apparatus and an image forming apparatus including the same.

2. Description of Related Art

In a typical image forming apparatus, a photosensitive drum and an intermediate transfer belt are rotated at a predetermined speed that is driven by a driving motor through a respective gear apparatus. Accordingly, the photosensitive drum and the intermediate transfer belt may receive an impact load at a paper during charge or discharge periods. For example, when a paper is loaded into a secondary transfer unit, the intermediate transfer belt may receive an impact load. Also, because this impact is transmitted through the intermediate transfer belt, the photosensitive drum also receives an impact load. Such an impact may need to be suppressed because it may cause a drive non-uniformity of the intermediate transfer belt or a rotation non-uniformity of the photosensitive drum and may create a black stripe or a white stripe in a generated image.

Accordingly, related art attempts a scheme for increasing the rotation stiffness of the intermediate transfer belt or the photosensitive drum by the driving motor, particularly, a scheme for improving the stiffness of a gear that may be considered as a way of increasing resistance to an impact load. The related art describes a scheme for improving the stiffness of a gear by attaching a reinforcing plate to the gear. However, such a scheme is not ideal because a precise assembly process is required, and the precision of the gear may be difficult to maintain.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide gear apparatuses and image forming apparatuses, which may improve gear stiffness and maintain gear precision. Also, additional aspects will be set forth in part in the description which follows and, in part, will be apparent from the description, or may be learned by practice of one or more exemplary embodiments.

According to an aspect of an exemplary embodiment, there is provided a gear apparatus including: a gear including a shaft hole and a gear portion; a rotation shaft that is inserted into the shaft hole; a reinforcing member including a through hole into which the rotation shaft is inserted, and has a stiffness that is higher than a stiffness of the gear; a first hooking portion that is provided at the gear; a first hooked portion that is provided at the reinforcing member and is configured to be engaged with the first hooking portion in a direction of rotation of the gear, such that the reinforcing member and the gear rotate together; a second hooking portion that is provided at the rotation shaft; and a second hooked portion that is provided at the reinforcing member and is configured to be engaged with the second hooking portion in the direction of rotation, such that the reinforcing member and the rotation shaft rotate together.

The gear may include a boss portion in which the shaft hole is formed, a rim portion in which the gear portion is formed, and a web portion connecting the boss portion and the rim portion, wherein the first hooking portion may further include a radial rib portion that extends radially from the boss portion, and wherein the first hooked portion may further include a first convex hooked portion that is hooked with the radial rib portion in the direction of rotation.

The gear may further include a boss portion in which the shaft hole is formed, a rim portion in which the gear portion is formed, and a web portion connecting the boss portion and the rim portion, wherein the first hooking portion may further include a concave hooking portion that is formed at the web portion, and wherein the first hooked portion may further include a first convex hooked portion that is inserted into the concave hooking portion.

The gear may further include a plurality of radial rib portions that extend radially from the boss portion, and wherein the concave hooking portion may include a plurality of concave hooking portions on a same radius from the shaft hole, and wherein an amount of the concave hooking portions is a common divisor of an amount of radial rib portions and an amount of gates for injection-molding the gear.

The concave hooking portion may be formed radially at an inner side radially in comparison to a position of the gate.

The second hooking portion may include a convex hooking portion protruding in a direction that is perpendicular to a rotation axis of the rotation shaft, and wherein the second hooked portion may further include a concave hooked portion into which the convex hooking portion is configured to be inserted.

The reinforcing member may include a sintered metal.

The gear apparatus may further include a position determining portion that may be configured to determine a radial position of the reinforcing member with respect to the gear.

The position determining portion may also include the through hole, and a cylinder portion that is concentric with the shaft hole, and which is provided at the gear to protrude in a rotation axis direction of the rotation shaft, and which is inserted into the through hole.

The position determining portion may also include a cylinder portion that is concentric with the shaft hole, is provided at the gear, and may be configured to protrude in a rotation axis direction of the rotation shaft, and an outer periphery contact portion that is concentric with the through hole, is provided at the reinforcing member, and may be configured to be inserted into the cylinder portion.

According to an aspect of another exemplary embodiment, there is provided a gear apparatus including a gear including a shaft hole; a reinforcing member that has a stiffness that is higher than a stiffness of the gear; a rotation shaft inserted into the shaft hole of the gear through the reinforcing member; a first connecting portion configured to connect the gear and the reinforcing member such that the gear and the reinforcing member rotate together, and which is provided at a radial circumference of the shaft hole; and a second connecting portion configured to connect the reinforcing member and the rotation shaft such that the reinforcing member and the rotation shaft rotate together.

In some examples, the first connecting portion may include a first hooking portion that is provided at the gear; and a first hooked portion that is provided at the reinforcing member and which is engaged with the first hooking portion in a direction of rotation of the gear such that the reinforcing member and the gear rotate together.

The gear may also include a boss portion in which the shaft hole is formed, a rim portion in which a gear portion is formed, and a web portion connecting the boss portion and the rim portion, wherein the first hooking portion may further include a radial rib portion that extends radially from the boss portion, and wherein the first hooked portion may further include a first convex hooked portion that is hooked with the radial rib portion in the rotation direction.

The gear may include a boss portion in which the shaft hole is formed, a rim portion in which a gear portion is formed, and a web portion connecting the boss portion and the rim portion, wherein the first hooking portion may further include a concave hooking portion that is formed at the web portion, and wherein the first hooked portion may further include a first convex hooked portion that is inserted into the concave hooking portion.

The gear may further include a plurality of radial rib portions that extend radially from the boss portion, wherein the concave hooking portion may include a plurality of concave hooking portions on a same radius from the shaft hole, and wherein an amount of concave hooking portions may be a common divisor of an amount of radial rib portions and an amount of gates for injection-molding the gear.

The concave hooking portion may be formed at an inner side radially in comparison to a position of the gate.

The reinforcing member may include a sintered metal.

According to an aspect of another exemplary embodiment, an image forming apparatus includes the gear apparatus described herein, a photoconductive member in which an electrostatic latent image is formed; a developer configured to develop the electrostatic latent image; and a transferor configured to transfer a developed image to a recording medium, and wherein at least one of the photoconductive member and the transferor is configured to be driven in connection with the rotation shaft of the gear apparatus.

BRIEF DESCRIPTION OF THE DRAWINGS

These and/or other aspects will become more apparent and more readily appreciated from the following description of exemplary embodiments, taken in conjunction with the accompanying drawings, in which.

DETAILED DESCRIPTION

Figure 1:
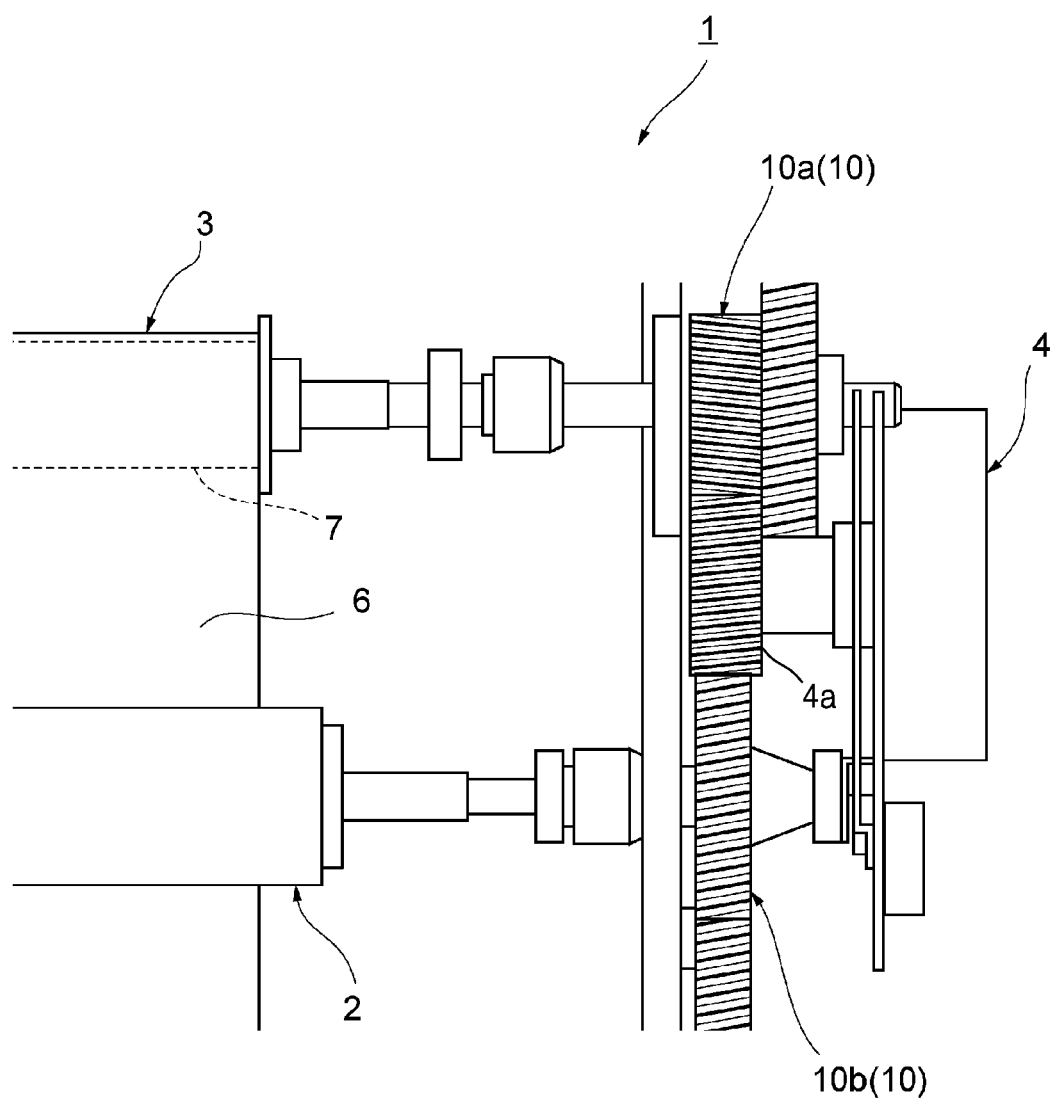
FIG. 1 is a diagram illustrating a photoconductive member and an intermediate transfer unit of an image forming apparatus according to an exemplary embodiment.

Reference will now be made to exemplary embodiments, examples of which are illustrated in the accompanying drawings, wherein like reference numerals are understood to refer to like elements throughout. Accordingly, it should be understood that the exemplary embodiments may have different forms and should not be construed as being limited to the descriptions that are set forth herein. Accordingly, the exemplary embodiments are described below, by referring to the figures, in order to explain exemplary aspects of the present description. Also, it should be appreciated that as used herein, expressions such as "at least one of," when preceding a list of elements, modify the entire list of elements and should not be understood as modifying the individual elements of the list.

Hereinafter, one or more exemplary embodiments of gear apparatuses and the image forming apparatuses are described with reference to the drawings. Also, like reference numerals will be used to denote like elements throughout the specification and drawings, and redundant descriptions thereof will be omitted for conciseness.

Figure 10:
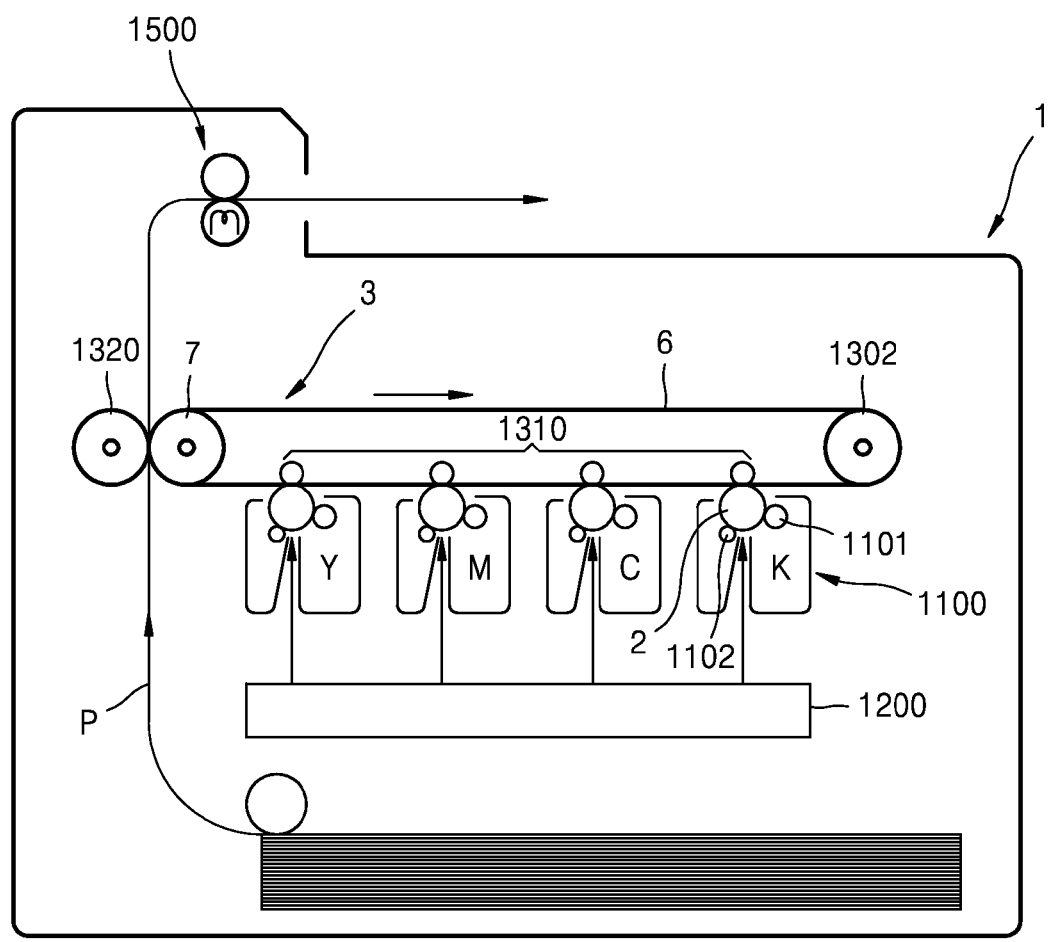
FIG. 10 is a diagram illustrating an image forming apparatus according to an exemplary embodiment.

FIG. 10 is a diagram illustrating an example of an image forming apparatus 1 according to an exemplary embodiment. For example, the image forming apparatus 1 may be an electrophotographic color image forming apparatus that is capable of forming color images using four developing units 1100 that contain cyan (C), magenta (M), yellow (Y), and black (K) color toners, respectively. Hereinafter, example members that are used to form cyan (C), magenta (M), yellow (Y), and black (K) images that are denoted by their respective reference numerals accompanied with C, M, Y, and K, respectively.

For example, as illustrated in FIG. 10, the image forming apparatus 1 includes a photoconductive member 2 and an intermediate transfer unit 3 (e.g., transferor). In this example, in addition to the photoconductive member 2 and the intermediate transfer unit 3, the image forming apparatus 1 includes various elements that may be used for forming an image. An example of the image forming apparatus 1 is described with reference to FIG. 10.

Referring to FIG. 10, the image forming apparatus 1 includes four developing units 1100 (e.g., developers), an exposing unit 1200 (e.g., exposers), the intermediate transfer unit 3, and a fixing unit 1500 (e.g., fixers).

In this example, each of the four developing units 1100 includes a photoconductive member 2. For example, the photoconductive member 2 may be a drum-type electrostatic latent image carrier (e.g., a photoconductive drum), in which an image (toner) is formed on an outer periphery thereof, and may include a structure in which a photoconductive layer (e.g., an organic photoconductor (OPC) layer) is formed on an outer periphery of a cylindrical metal pipe. In this example, a charge roller 1102 is an example of a charge unit for charging the surface of the photoconductive member 2 to a uniform potential. In this example, a corona charge unit may be used instead of the charge roller 1102.

For example, the exposing unit 1200 may form an electrostatic latent image by irradiating light, which is modulated corresponding to image information, to the photoconductive member 2. As an example, the exposing unit 1200 may include a light-emitting diode (LED)-type exposing unit that emits light selectively according to image information using a plurality of LEDs arranged in a primary scan direction. Also, in some examples the exposing unit 1200 may include a laser scanning unit (LSU) that scans the photoconductive member 2 by deflecting light, which is irradiated from a laser diode, in the main scan direction using a light deflector.

A developing roller 1101 may form a toner image by attaching a developer (e.g., a toner), which is contained in the developing unit 1100, to the electrostatic latent image that is formed on the photoconductive member 2. For example, the toner may be contained in the developing unit 1100, or may be supplied to the developing unit 1100 from a toner container. In this example, when the toner contained in the toner container is completely consumed, the toner container may be replaced separately from the developing unit 1100.

In some examples, the intermediate transfer unit 3 may transfer the image that is formed on the photoconductive member 2 to a paper (recording medium) P. For example, the intermediate transfer unit 3 may transfer the toner image to the paper P through an intermediate transfer belt 6. In this example, the intermediate transfer unit 3 may include the intermediate transfer belt 6, a primary transfer roller 1310, a secondary transfer roller 7, and a secondary transfer backup roller 1320. The intermediate transfer belt 6 may be used as an endless belt for transferring the image that is formed on the photoconductive member 2 to the paper P. For example, the intermediate transfer belt 6 may be rotated while being supported by the secondary transfer roller 7 and a support roller 1302. In this example, the primary transfer roller 1310 may be disposed such that it faces the photoconductive member 2 with the intermediate transfer belt 6 therebetween. The secondary transfer roller 7 and the secondary transfer backup roller 1320 are such that they face each other with the intermediate transfer belt 6 therebetween.

In this example, a primary transfer bias voltage may be applied between the primary transfer roller 1310 and the photoconductive member 2 to primarily transfer the image formed on the photoconductive member 2 onto the intermediate transfer belt 6. Also, in this example, a secondary transfer bias voltage may be applied between the secondary transfer roller 7 and the secondary transfer backup roller 1320 in order to secondarily transfer the image on the intermediate transfer belt 6 to the paper P.

In these examples, the fixing unit 1500 fixes the image that is transferred to the paper P by applying heat and pressure thereto.

An example of a color image forming process according to the above configuration is described in brief.

In this example, according to black (K) color image information, the exposing unit 1200 may form an electrostatic latent image by irradiating light to a photoconductive member 2K that is charged to a uniform potential by the charge roller 1102. Accordingly, when a developing bias voltage is applied to a developing roller 1101K of a developing unit 1100K, a black toner that is contained in the developing unit 1100K becomes attached as an electrostatic latent image. For example, a black image that is developed on the photoconductive member 2K may be primarily transferred to the intermediate transfer belt 6 by the primary transfer bias voltage. In this example, cyan, magenta, and yellow images may also be primarily transferred to the intermediate transfer belt 6, so that a color image may be formed on the intermediate transfer belt 6. For example, through the secondary transfer bias voltage, the color image may be secondarily transferred to the paper P that is passing between the intermediate transfer belt 6 and the secondary transfer backup roller 1320. Here, the color image that is transferred to the paper P may be fixed to the paper P by the fixing unit 1500. In this example, the developer remaining on the surface of the photoconductive member 2 after the transfer may be removed by a cleaning device.

FIG. 1 is a diagram illustrating the photoconductive member 2 and the intermediate transfer unit 3 of the image forming apparatus 1. In this example, the photoconductive member 2 may be rotated at a predetermined speed by a driving motor 4 through a gear apparatus 10b. Also, the secondary transfer roller 7 may be rotated at a predetermined speed by the driving motor 4 through a gear apparatus 10a in order to drive the intermediate transfer belt 6.

The gear apparatus 10b that is used for rotating the photoconductive member 2 and the gear apparatus 10a that is used for rotating the secondary transfer roller 7 have the same basic configuration while having different dimensions and shapes in these examples. Thus, hereinafter, the gear apparatus 10a and the gear apparatus 10b are described together as a gear apparatus 10.

Figure 2:
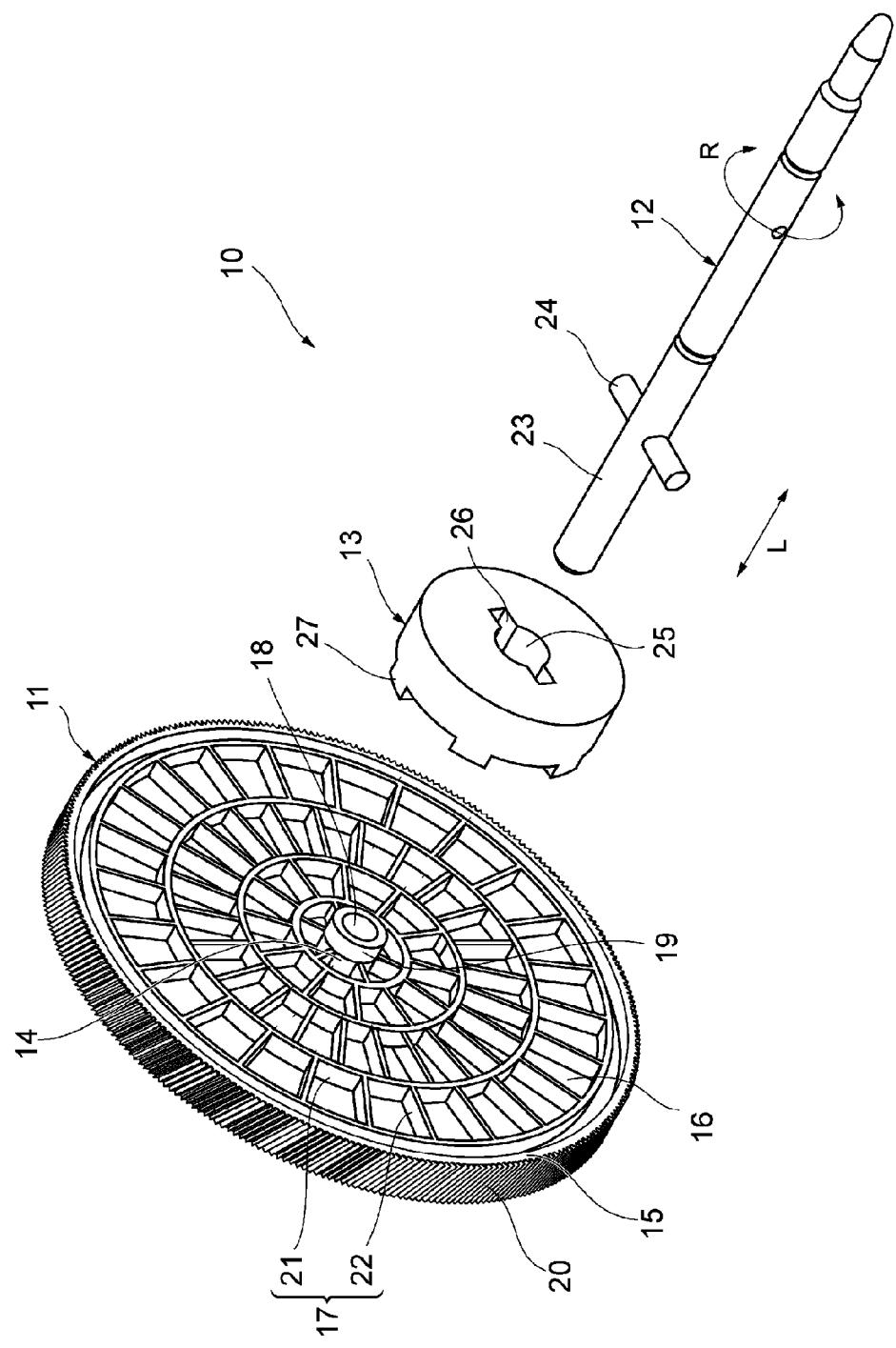
FIG. 2 is an exploded perspective view of a diagram of a gear apparatus according to an exemplary embodiment.
Figure 3:
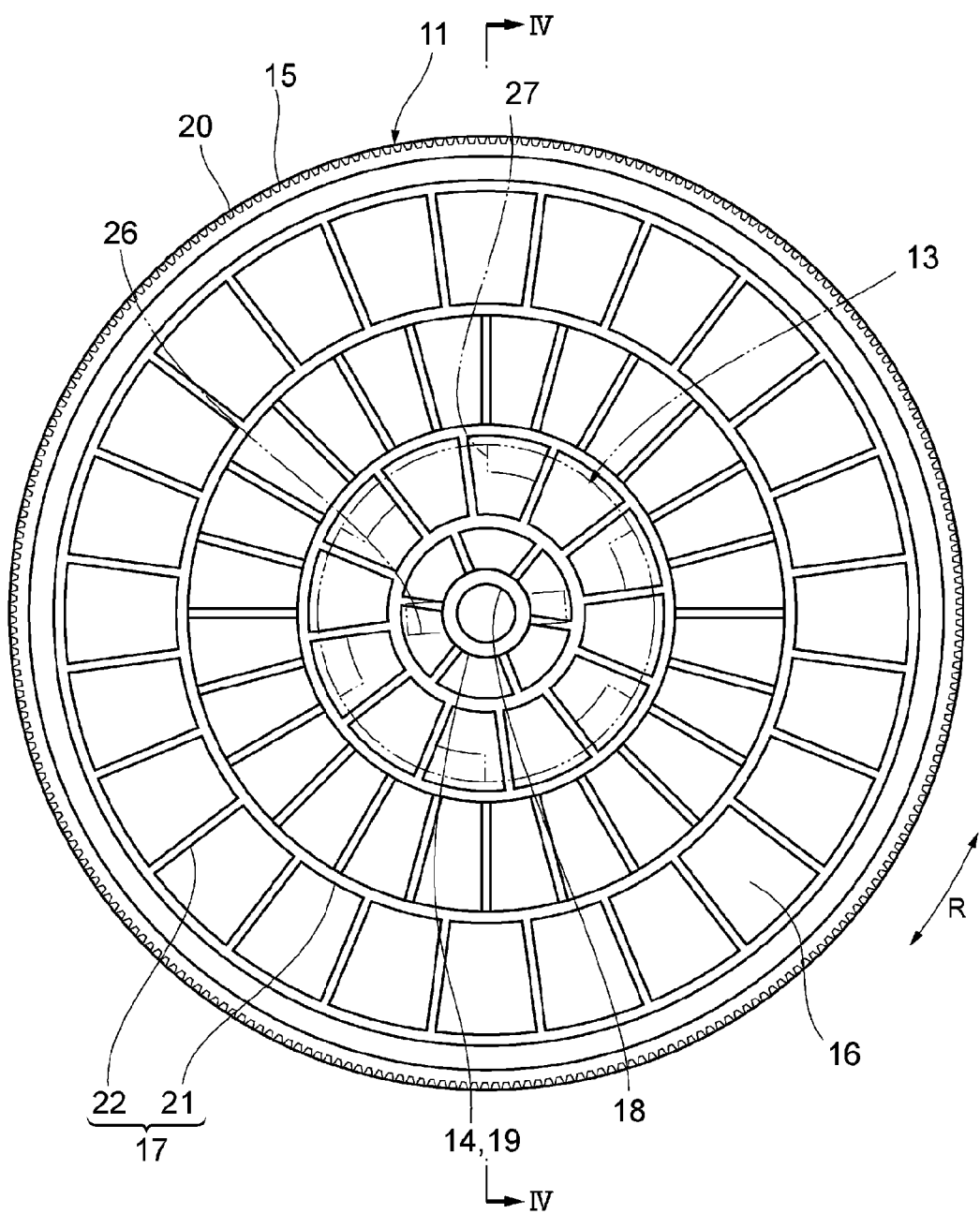
FIG. 3 is a front view of a gear illustrated in FIG. 1.
Figure 4:
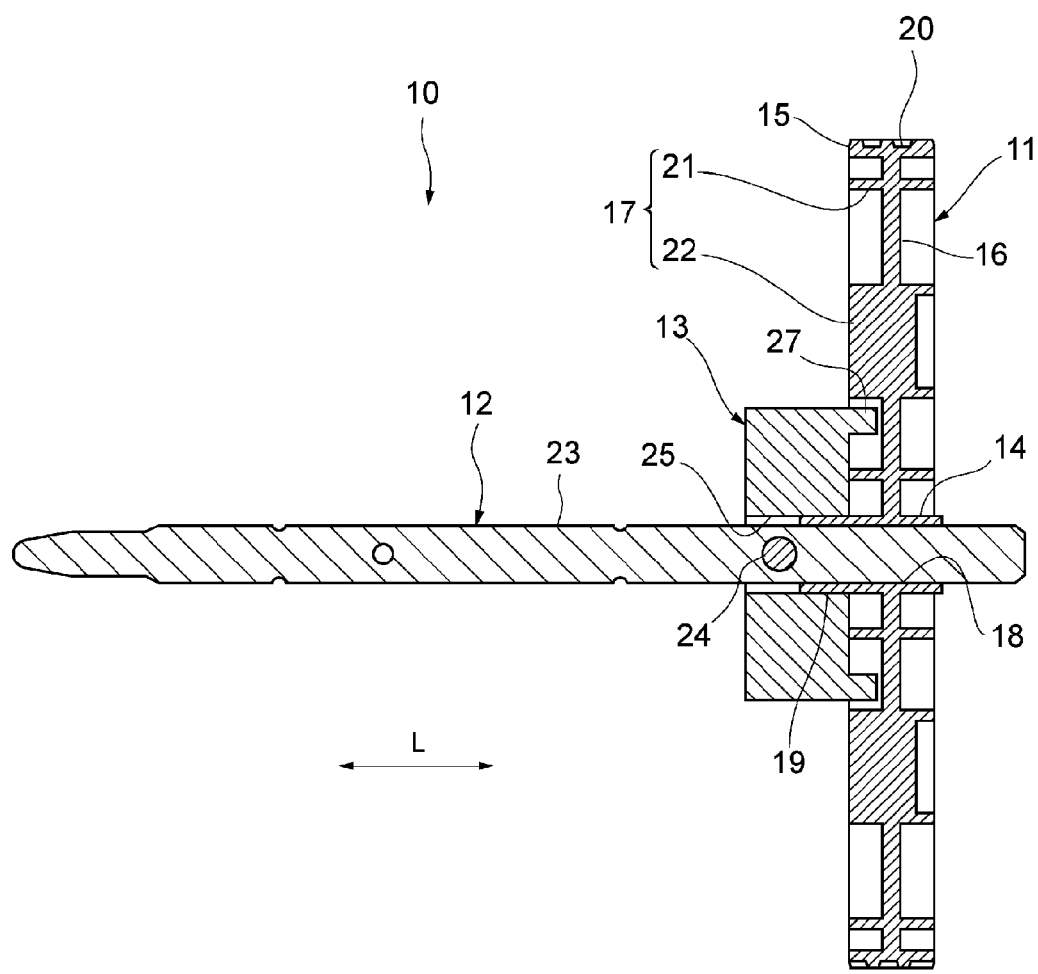
FIG. 4 is a cross-sectional view that is taken along a line illustrated in the example of IV-IV of FIG. 3.

FIG. 2 is an exploded perspective diagram of a gear apparatus 10 according to an exemplary embodiment. FIG. 3 is a front view of a gear 11 that is illustrated in FIG. 2. FIG. 4 is a cross-sectional view that is taken along a line IV-IV of FIG. 3. Also, as illustrated in FIGS. 2 to 4, the gear apparatus 10 may include the gear 11, a rotation shaft 12, and a reinforcing member 13.

For example, the reinforcing member 13 is connected to the gear 11 by a first connecting portion in order to rotate together with the gear 11. For example, the rotation shaft 12 may be inserted through the reinforcing member 13 into a shaft hole 18 that is provided at the gear 11. In this example, the rotation shaft 12 is connected to the reinforcing member 13 by a second connecting portion to rotate together with the reinforcing member 13. The first connecting portion is disposed at a radial position that is outside of the shaft hole 18. For example, the first connecting portion may include a first hooking portion provided at the gear 11; and a first hooked portion that is provided at the reinforcing member 13 and that is engaged with the first hooking portion in a rotation direction of the gear 11. The second connecting portion may include a second hooking portion provided at the rotation shaft 12 and a second hooked portion provided at the reinforcing member 13 and that is engaged with the second hooking portion in the rotation direction.

Hereinafter, exemplary embodiments of a first and second connecting portions are further described.

The gear 11 is rotated by the driving motor 4. For example, a rotation direction of the gear apparatus 10 (the gear 11) may be referred to as a rotation direction R, and a rotation axis of the gear apparatus 10 (the gear 11) may be referred to as a rotation axis L. The gear 11 may be formed of resin, and may be formed by injection molding in the shape of a circular plate around the rotation axis L. For example, a polyacetal may be used as a material of the gear 11. Also, as a non-limiting example, the gear 11 may include a boss portion 14, a rim portion 15, a web portion 16, and a rib 17.

In this example, the boss portion 14 is located at a radial center of the gear 11. The boss portion 14 may also have a cylindrical shape around the rotation axis L. The shaft hole 18, into which the rotation shaft 12 is inserted, may be formed in the boss portion 14. The shaft hole 18 in this example passes through the gear 11 and has a shape of a circle around the rotation axis L. Also, the boss portion 14 includes a cylinder portion 19 that protrudes in a rotation axis L direction. For example, the cylinder portion 19 may have a cylindrical shape around the rotation axis L. That is, the cylinder portion 19 may be concentric with the shaft hole 18. The inner diameter and the outer diameter of the cylinder portion 19 are equal to the inner diameter and the outer diameter of the boss portion 14, respectively.

The rim portion 15 may be located at an outer periphery of the gear 11. For example, the rim portion 15 may have a cylindrical shape around the rotation axis L. That is, the rim portion 15 is concentric with the boss portion 14 in this example. A gear portion 20 is formed at an outer periphery of the rim portion 15. The gear portion 20 may be directly or indirectly engaged with a gear 4a that is attached to an output side of the driving motor 4.

The web portion 16 connects with the boss portion 14 and the rim portion 15. As an example, the web portion 16 may substantially have a shape of a circular plate that is thinner than the boss portion 14 and the rim portion 15. Also, the web portion 16 may be formed to have a uniform thickness to fill a space that is between the boss portion 14 and the rim portion 15.

The rib 17 functions as the first hooking portion on which the reinforcing member 13 is hooked in a rotation direction of R. Here, the rib 17 reinforces the gear 11. The rib 17 may protrude from one side or both sides of the web portion 16. A cross-sectional shape of the rib 17 may be, for example, a rectangular shape but it is not limited thereto. As another example, the rib 17 may include a cylindrical rib portion 21 and a radial rib portion 22. In an exemplary embodiment, although the rib 17 is described as including the cylindrical rib portion 21, the rib 17 may not include the cylindrical rib portion 21.

Also the cylindrical rib portion 21 may be formed between the boss portion 14 and the rim portion 15 in a circular shape around the rotation axis L. That is, the cylindrical rib portion 21 may be concentric with the boss portion 14 and the rim portion 15. In this example, one or more cylindrical rib portions 21 may be provided.

In this example the radial rib portion 22 functions as the first hooking portion on which the reinforcing member 13 is hooked in the rotation direction R. For example, the radial rib portion 22 may extend radially from the boss portion 14 (the radial center of the gear 11). That is, the radial rib portion 22 extends in a direction perpendicular to the rotation direction R. When one cylindrical rib portion 21 is provided, the radial rib portion 22 may connect the boss portion 14 to the cylindrical rib portion 21 and connect the cylindrical rib portion 21 to the rim portion 15. When a plurality of cylindrical rib portions 21 are provided, the radial rib portion 22 may connect the adjacent cylindrical rib portions 21 to each other. Also, when no cylindrical rib portion 21 is provided, the radial rib portion 22 connects the boss portion 14 and the rim portion 15 to each other.

The rotation shaft 12 is connected to the photoconductive member 2 or the secondary transfer roller 7 to rotate the photoconductive member 2 or the secondary transfer roller 7. The rotation shaft 12 may also include a rod portion 23 and a hooking convex portion 24.

In this example, the rod portion 23 is connected to the photoconductive member 2 or the secondary transfer roller 7 and is also inserted into the shaft hole 18 of the gear 11. For example the rod portion 23 may have a shape of a circular rod of which an outer periphery has a shape of a circle. The outer diameter of the rod portion 23 may be equal to or substantially equal to the inner diameter of the shaft hole 18. For example, when the rod portion 23 is inserted into the shaft hole 18, the radial position of the gear 11 with respect to the rotation shaft 12 may be determined. Also, the outer diameter of the rod portion 23 may not be equal to or substantially equal to the inner diameter of the shaft hole 18 throughout the entire length thereof, and only the outer diameter of at least a portion thereof may be inserted into the shaft hole 18 and may be equal to or substantially equal to the inner diameter of the shaft hole 18.

The hooking convex portion 24 may function as the second hooking portion on which the reinforcing member 13 is hooked in the rotation direction R. The hooking convex portion 24 may protrude from the rod portion 23. The hooking convex portion 24 may protrude from the rod portion 23 in a direction that is perpendicular to the rotation axis L of the rotation shaft 12. For example, the hooking convex portion 24 may include a rod-type shape that includes a parallel pin having both ends protruding from the rod portion 23 through the rod portion 23, or a rectangular plate-type key protruding from the outer periphery of the rod portion 23.

In these examples, the reinforcing member 13 reinforces the gear 11 and transmits a rotation driving force of the gear 11 to the rotation shaft 12. For example, the reinforcing member 13 may be formed of a stiffer material than the gear 11. For example, the reinforcing member 13 may be formed of a sintered metal that is formed by sintering metal powders. In this example, the reinforcing member 13 includes a through hole 25, a hooked concave portion 26, and a first hooked convex portion 27.

According to one or more exemplary embodiments, a rotation shaft 12 and the cylinder portion 19 of the gear 11 may be inserted into the through hole 25. The through hole 25 may be formed at a center of the reinforcing member 13. For example, the through hole 25 may be substantially formed in a shape of a circle and may pass through the reinforcing member 13. In this example, the reinforcing member 13 is formed in a cylindrical shape that is around the rotation axis L and has an inner hole as the through hole 25. The inner diameter of the through hole 25 that may be equal to or substantially equal to the outer diameter of the cylinder portion 19 so that the cylinder portion 19 is inserted into the through hole 25. When the cylinder portion 19 is inserted into the through hole 25, the radial position of the reinforcing member 13 with respect to the gear 11 can be determined. In this example, the through hole 25 and the cylinder portion 19 function as a position determining portion that determines the radial position of the reinforcing member 13 with respect to the gear 11.

The hooked concave portion 26 may also function as a second hooked portion that is hooked with the hooking convex portion 24 in the rotation direction R. The hooked concave portion 26 may be provided corresponding to the hooking convex portion 24 of the rotation shaft 12. For example, the hooked concave portion 26 may extend from the through hole 25 to the radial outside of the reinforcing member 13 so that the hooking convex portion 24 may be inserted into it. The shape of the hooked concave portion 26 is not limited to a particular shape, and the hooked concave portion 26 may have any shape that may be hooked with the hooking convex portion 24 in the rotation direction R. For example, the hooked concave portion 26 may have a rectangular shape corresponding to an external shape of the hooking convex portion 24. Also, the hooked concave portion 26 may or may not pass through the reinforcing member 13. When the hooking convex portion 24 of the rotation shaft 12 is inserted into the hooked concave portion 26, the hooked concave portion 26 is hooked with the hooking convex portion 24 in the rotation direction R.

The first hooked convex portion 27 functions as a first hooked portion that is hooked with a radial rib portion 22 in the rotation direction R. The first hooked convex portion 27 protrudes toward the gear 11 along the rotation axis L. The shape of the first hooked convex portion 27 is not limited to a particular shape. For example, the first hooked convex portion 27 may have a shape of a circular arc plate following the outer periphery of the reinforcing member 13. The cross-section of the first hooked convex portion 27 in the rotation direction R may have a shape that surface-contacts the radial rib portion 22. For example, the cross sections of the first hooked convex portion 27 and the radial rib portion 22 in the rotation direction R may have a shape of a plane that includes a line parallel to the rotation axis L and a line extending radially from the rotation axis L.

The first hooked convex portion 27 may be provided in plurality on the same circle around the rotation axis L. The first hooked convex portions 27 may be provided at equidistant positions in the rotation direction R, corresponding to the positions of the radial rib portions 22 when the cylinder portion 19 is inserted into the through hole 25. The length of the first hooked convex portion 27 in the rotation direction R may be less than the distance between the adjacent radial rib portions 22 in the rotation direction R.

When the rod portion 23 is inserted into the shaft hole 18, the cylinder portion 19 is inserted into the through hole 25. Accordingly, the radial positions of the gear 11, the rotation shaft 12, and the reinforcing member 13 are determined. Also, the rotation shaft 12 is rotatably supported in the image forming apparatus 1 to rotate at a predetermined position. Also, when the hooking convex portion 24 is inserted into the hooked concave portion 26, the first hooked convex portion 27 is inserted between the adjacent radial rib portions 22 in the rotation direction R to be hooked with the radial rib portion 22 in the rotation direction R. Accordingly, the rotation driving force of the gear 11 is transmitted to the rotation shaft 12 through the reinforcing member 13.

Figure 9:
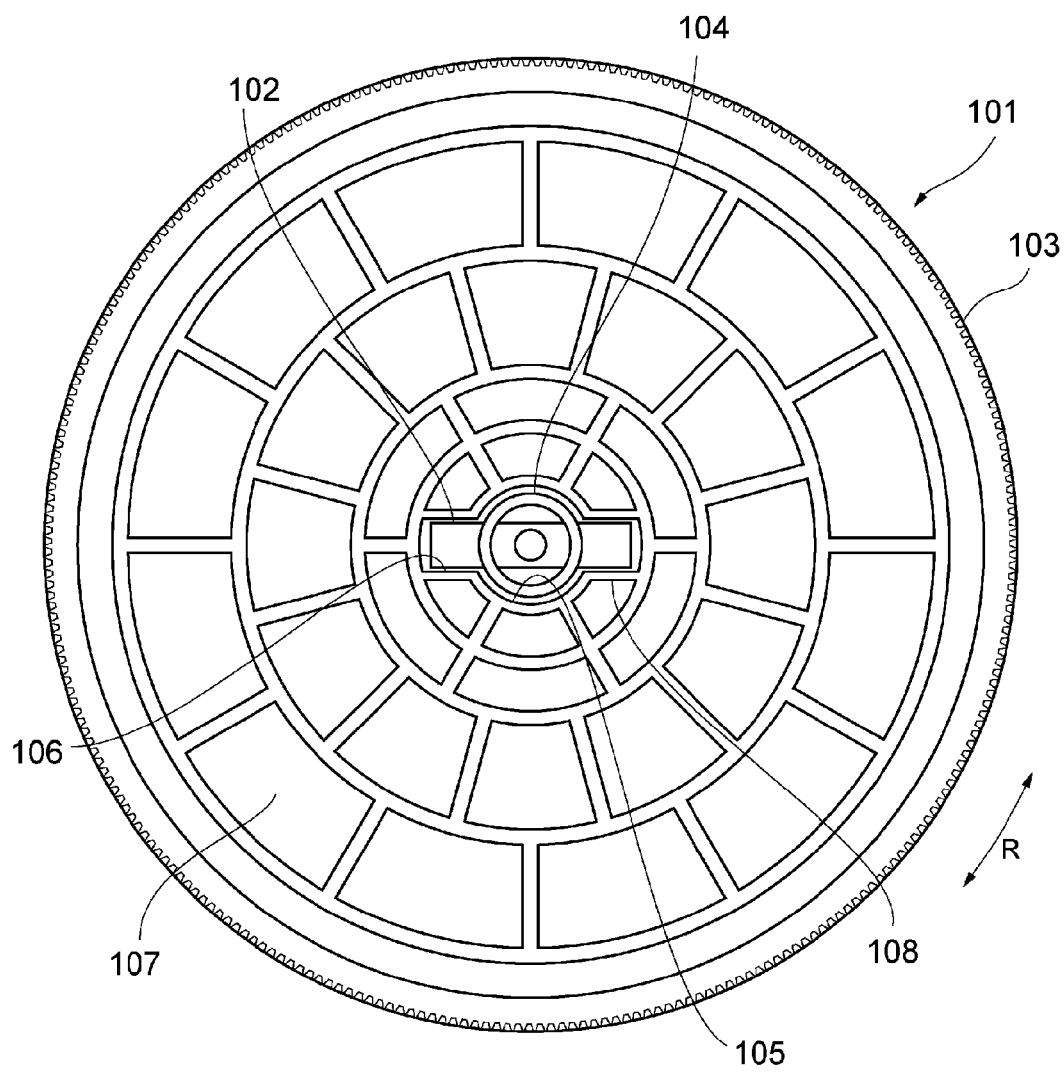
FIG. 9 is a diagram illustrating a front view of a gear according to an exemplary embodiment.

A gear apparatus according to an exemplary embodiment will now be described. FIG. 9 is a front view of a gear apparatus according to an exemplary embodiment. As illustrated in FIG. 9, in a gear apparatus 101 according to an exemplary embodiment, a rotation driving force of a gear 103 is directly transmitted to a rotation shaft 104 by a parallel pin 102. That is, a hooked concave portion 106, into which the parallel pin 102 is inserted and on which the parallel pin 102 is hooked in the rotation direction R, is formed at a shaft hole 105 of the gear 103. Also, a rib 108 surrounding the hooked concave portion 106 is provided at a web portion 107 of the gear 103.

In a gear apparatus 101, since the hooked concave portion 106 is formed at the shaft hole 105, the shaft hole 105 may not be formed in a shape of a circle. Thus, the engagement precision of the gear 103 may be degraded. Also, since the distortion of the gear 103 by thermal contraction increases in the case of injection-molding the gear 103, it may be difficult to manufacture the gear 103 with high precision. Also, since the web portion 107 and the rib 108 receive a shear load due to the rotation driving force of the parallel pin 102, it is difficult to maintain the precision of the gear 103. Also, since contact between a parallel pin 102 and a gear 103 is ideally a line contact but is actually a point contact, a stress concentration may increase excessively. Also, since a point-contact position between the parallel pin 102 and the gear 103 is a position of a small rotation radius, a contact force between them increases. Thus, when an impact load is applied to the photoconductive member 2 and the intermediate transfer belt 6, an instantaneous strain may occur at the contact point between the parallel pin 102 and the gear 103, which may cause a non-uniform rotation of the photoconductive member 2 and a non-uniform driving of the intermediate transfer belt 6.

A scheme of fixing a reinforcing plate to the gear by a fastening member such as a screw may be considered in order to improve the stiffness of the gear. However, in that case, a precise assembly process is required, and the precision of the gear may be difficult to maintain.

However, in a gear apparatus 10 according to an exemplary embodiment, the first hooked convex portion 27 of the reinforcing member 13 may be hooked with a first hooking portion (e.g., a radial rib portion 22) of the gear 11, and the hooking convex portion 24 of the rotation shaft 12 may be hooked with the hooked concave portion 26. Therefore, since the rotation driving force of the gear 11 is transmitted to the rotation shaft 12 through the reinforcing member 13, the shaft hole 18 of the gear 11 may be formed in a shape of a circle. Also, the gear 11 may rotate together with the reinforcing member 13, which may be stiffer than the gear 11. Accordingly, the stiffness of a gear 11 may be improved and the precision of the gear 11 may be maintained.

Also, since the first hooked convex portion 27 of the reinforcing member 13 is hooked with the radial rib portion 22 of the gear 11, the rotation driving force of the gear 11 may be transmitted to the reinforcing member 13. That is, the shaft hole 18 of the gear 11 may not transmit the rotation driving force. Accordingly, since the shaft hole 18 may be formed in a shape of a circle, the precision of the gear 11 may be maintained. Also, since the radial rib portion 22 extends radially from the boss portion 14, the rotation driving force of the gear 11 may be transmitted to the reinforcing member 13 at a position distant from the shaft hole 18. Accordingly, stress on the gear 11 may be reduced and the precision of the gear 11 may be maintained.

Also, since the hooking convex portion 24 protruding in a direction perpendicular to the rotation axis L of the rotation shaft 12 may be inserted into the hooked concave portion 26 of the reinforcing member 13, the rotation driving force of the gear 11 may be securely transmitted to the rotation shaft 12.

Also, since the reinforcing member 13 may be formed of a sintered metal, the stiffness of the gear 11 may be further improved.

Also, since the cylinder portion 19 of the gear 11 may be inserted into the through hole 25 of the reinforcing member 13, the position of the reinforcing member 13 with respect to the gear 11 may be controlled. Accordingly, the total margin of the gear apparatus 10 (i.e., the deviation from a rotation axis L) may be reduced.

Also, in the image forming apparatus 1 according to an exemplary embodiment, since a gear apparatus 10 is used as a gear apparatus 10b rotating the photoconductive member 2, a rotation non-uniformity of the photoconductive member 2 may be suppressed. Accordingly, the quality of a generated image may be improved.

Also, in the image forming apparatus 1 according to an exemplary embodiment, since the gear apparatus 10 is used as the gear apparatus 10a rotating the secondary transfer roller 7, a rotation non-uniformity of the intermediate transfer belt 6 may be suppressed. Accordingly, the quality of a generated image may be improved.

Now, another exemplary embodiment will be described. Redundant descriptions of similar features to an exemplary embodiment described above may be omitted for conciseness.

Figure 5:
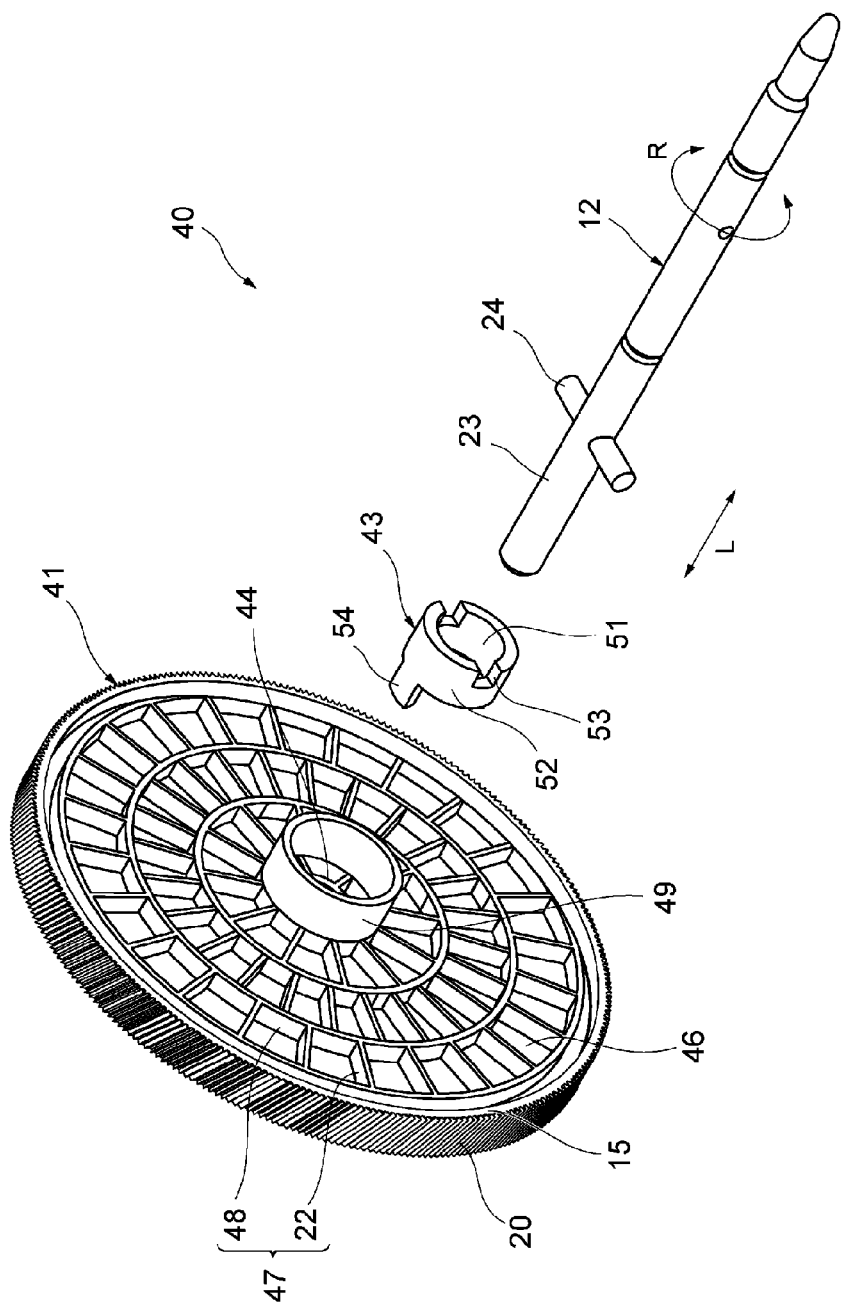
FIG. 5 is an exploded perspective view of a gear apparatus according to another exemplary embodiment.
Figure 6:
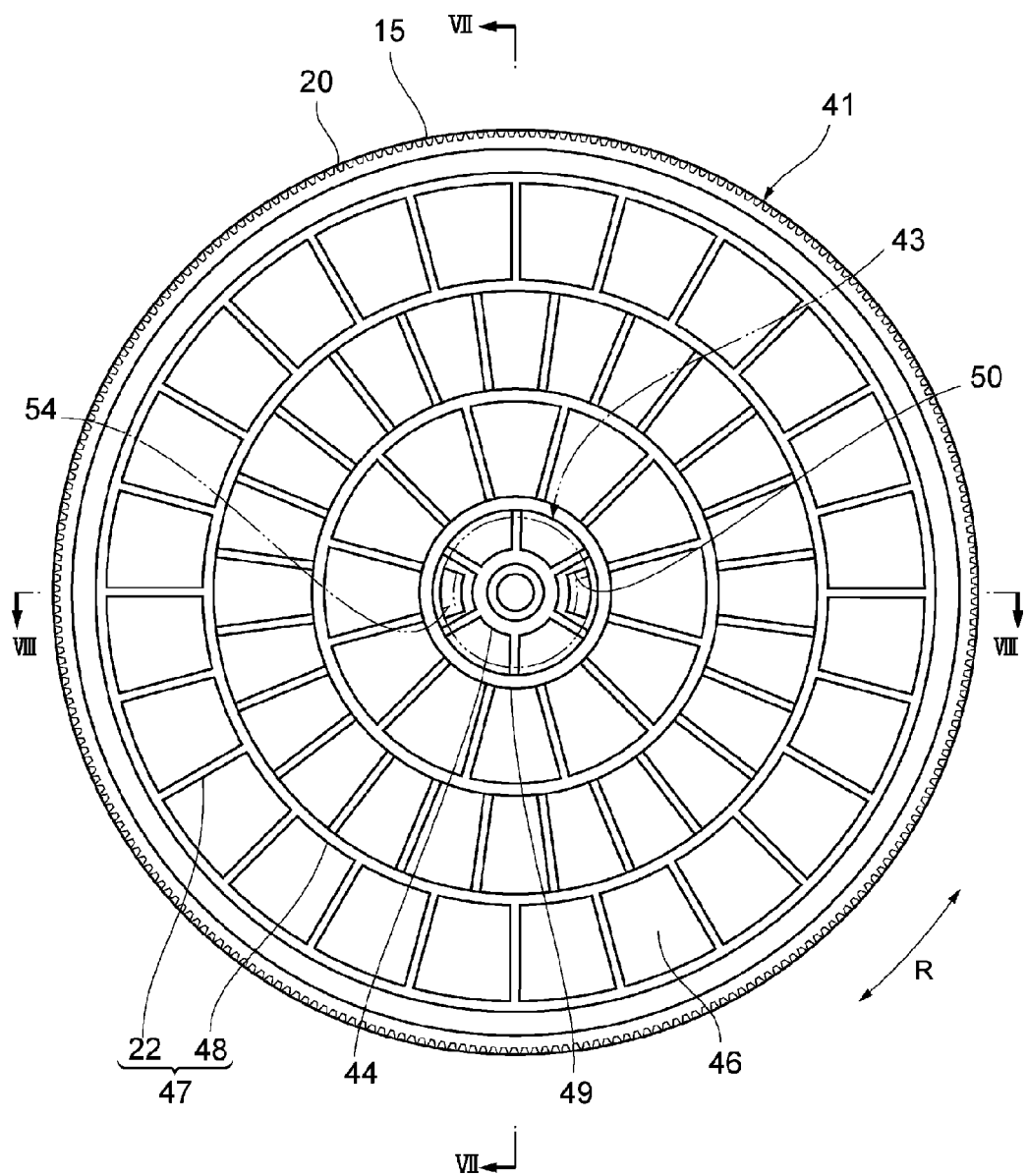
FIG. 6 is a front view of a gear that is illustrated in FIG. 5.
Figure 7:
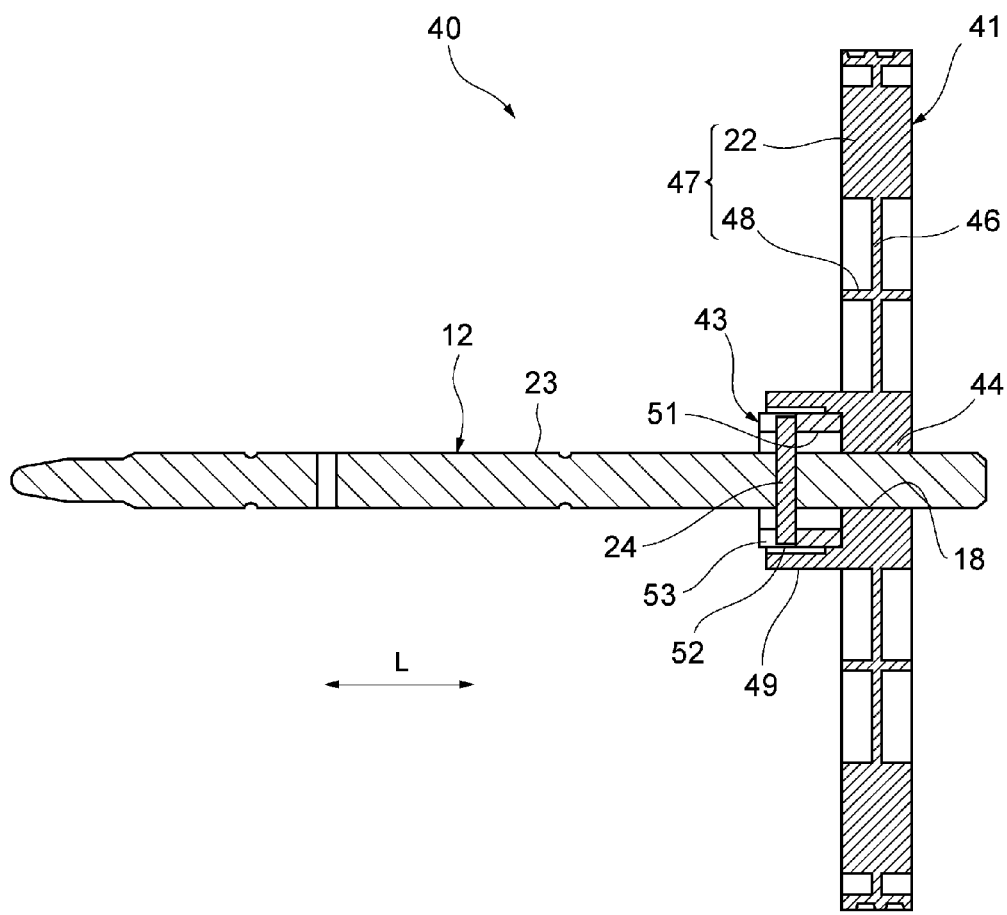
FIG. 7 is a cross-sectional diagram illustrating a line taken along the example of VII-VII of FIG. 6.
Figure 8:
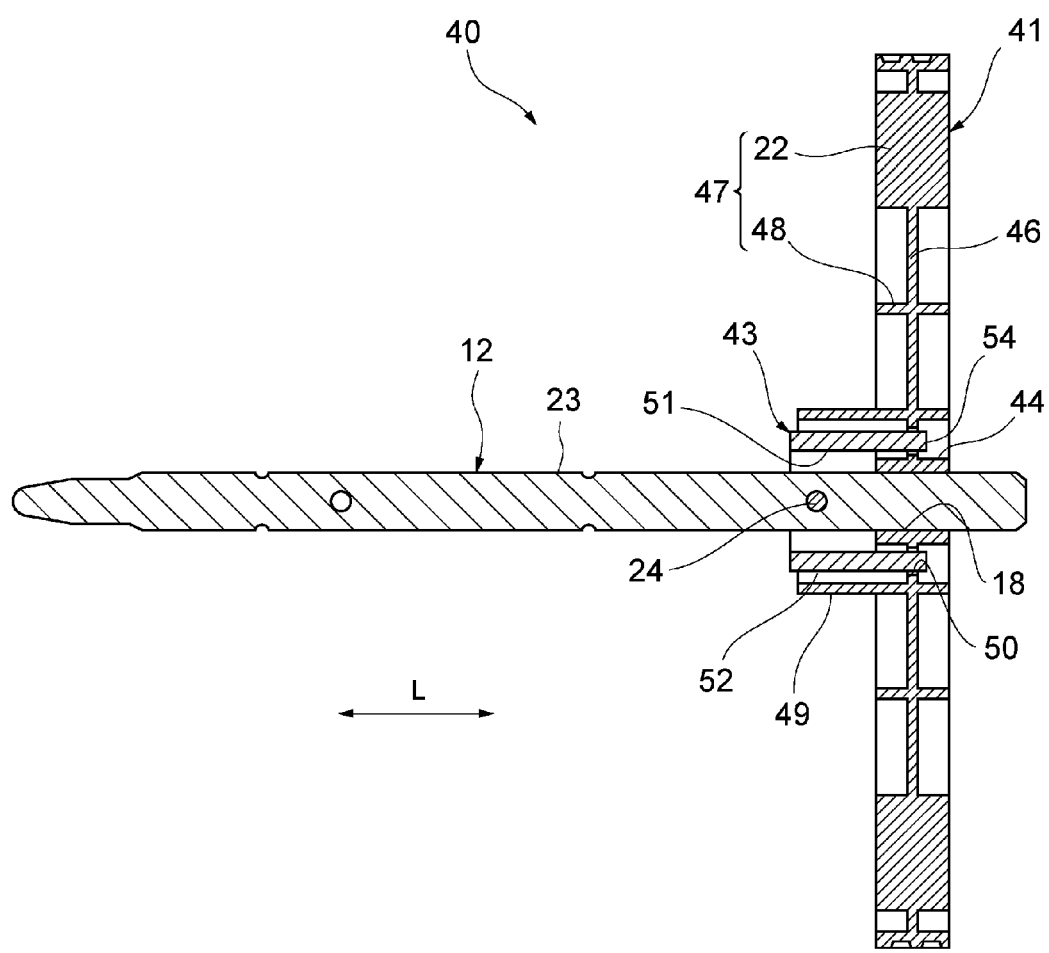
FIG. 8 is a cross-sectional diagram illustrating a line taken along the example of VIII-VIII of FIG. 6.

FIG. 5 is an exploded perspective view of a gear apparatus 40 according to an exemplary embodiment. FIG. 6 is a front view of a gear 41 illustrated in FIG. 5. FIG. 7 is a cross-sectional view taken along a line VII-VII of FIG. 6. FIG. 8 is a cross-sectional view taken along a line VIII-VIII of FIG. 6. As illustrated in FIGS. 5 to 8, the gear apparatus 40 may include a gear 41, a rotation shaft 12, and a reinforcing member 43.

The gear 41 is similar to the gear 11 of an exemplary embodiment described above, but a cylinder portion 49 is provided at a cylindrical rib portion 48, instead of at a boss portion 44, and a hooking concave portion 50 is provided at a web portion 46. Also, the gear 41 includes a rim portion 15 similar to the rim portion 15 of an exemplary embodiment described above, and includes a boss portion 44, a web portion 46, and a rib 47 corresponding respectively to the boss portion 14, the web portion 16, and the rib 17 of an exemplary embodiment described above.

The boss portion 44 may be substantially identical to the boss portion 14 of an exemplary embodiment described above except that a cylinder portion 19 is not formed thereon.

The rib 47 may be substantially identical to the rib 17 of an exemplary embodiment described above except that a cylinder portion 49 is provided at a cylindrical rib portion 48. The rib 47 includes the cylindrical rib portion 48, which corresponds to the cylindrical rib portion 21 of an exemplary embodiment described above, and a radial rib portion 22 identical to the radial rib portion 22 of an exemplary embodiment described above. Like the cylindrical rib portion 21, the cylindrical rib portion 48 is formed between the boss portion 44 and the rim portion 15 in a circular shape around the rotation axis L. The cylindrical rib portion 48 includes the cylinder portion 49 that protrudes in the rotation axis L direction. Like the cylindrical rib portion 48, the cylinder portion 49 has a cylindrical shape around the rotation axis L. When a plurality of cylindrical rib portions 48 are provided, the cylinder portion 49 is provided only at one of the cylindrical rib portions 48. In this example, the cylinder portion 49 may be provided at the radially innermost cylindrical rib portion 48 (i.e., the cylindrical rib portion 48 that is nearest to the rotation axis L).

A web portion 46 may be substantially identical to a web portion 16 of an exemplary embodiment described above, however, a hooking concave portion 50 may be formed at a web portion 46.

The hooking concave portion 50 may be a through hole that passes through a web portion 46. The hooking concave portion 50 may be formed at a position where the rib 47 is not formed. That is, the hooking concave portion 50 may be formed between two radial rib portions 22 that are adjacent to each other in the rotation direction R. Further, the hooking concave portion may be formed between the boss portion 44 and the cylindrical rib portion 48 at which the cylinder portion 49 is provided. When a plurality of cylindrical rib portions 48 are provided, the hooking concave portion 50 may be formed between the boss portion 44 and the radially innermost cylindrical rib portion 48, or between two cylindrical rib portions 48 that are radially adjacent to each other.

Also, the hooking concave portion 50 may be formed in plurality on a same radius of the gear 41. That is, a plurality of hooking concave portions 50 may be formed on a circle around the rotation axis L. The number of hooking concave portions 50 formed on a same radius of the gear 41 may be a common divisor of the number of radial rib portions 22 provided on the same radius as the hooking concave portion 50 and the number of gates for injection-molding the gear 41. For example, when the number of radial rib portions 22 provided on a same radius as the hooking concave portion 50 is "6" and the number of gates for injection-molding the gear 41 is "2", the number of hooking concave portions 50 formed on the same radius of the gear 41 may be "2". The gate is an inflow path through which a molten resin flows into a cavity of a mold for injection molding.

Also, the hooking concave portion 50 may be located at a radially more inner side than the position of the gate for injection-molding the gear 41. In general, when a plurality of gates are provided, the gates may be disposed on the same circle around the radial center of the gear 41 so that the molten resin may uniformly flow into the cavity of the mold. Also, the molten resin may flow more easily into the radially inner side than into the radially outer side with respect to the position of the gate. Thus, the hooking concave portion 50 may be located at a radially more inner side than the position of the gate.

The function and material of the reinforcing member 43 may be identical to those of the reinforcing member 13 of an exemplary embodiment described above. The reinforcing member 43 includes a through hole 51, an outer periphery contact portion 52, a hooked concave portion 53, and a second hooked convex portion 54.

The reinforcing member 43 may be formed in a cylindrical shape around the rotation axis L, and has an inner hole as the through hole 51 and an outer periphery as the outer periphery contact portion 52. The rotation shaft 12 may be inserted into the through hole 51. The outer periphery contact portion 52 may be concentric with the through hole 51. The outer periphery contact portion 52 may be inserted into the cylinder portion 49 of the gear 41. The cylinder portion 49 may be concentric with the shaft hole 18. The outer diameter of the outer periphery contact portion 52 may be equal to or substantially equal to the inner diameter of the cylinder portion 49 so that the outer periphery contact portion 52 is inserted into the cylinder portion 49. When the outer periphery contact portion 52 is inserted into the cylinder portion 49, the radial position of the reinforcing member 43 with respect to the gear 41 may be determined. Thus, the outer periphery contact portion 52 and the cylinder portion 49 may function as a position determining portion that determines the radial position of the reinforcing member 43 with respect to the gear 41.

The hooked concave portion 53 may function as a second hooked portion that is hooked with the hooking convex portion 24 in the rotation direction R. In detail, a hooked concave portion 53 is provided corresponding to the hooking convex portion 24 of the rotation shaft 12. The hooked concave portion 53 may extend from the through hole 51 to the radial outside of the reinforcing member 43 so that the hooking convex portion 24 may be inserted into it. The hooked concave portion 53 may have any shape that may be hooked with the hooking convex portion 24 in the rotation direction R. For example, when the reinforcing member 43 has a thin cylindrical shape, the hooked concave portion 53 may have the shape of a notch that is formed by cutting an end portion of the reinforcing member 43 along the rotation axis L direction. When the hooking convex portion 24 of the rotation shaft 12 is inserted into the hooked concave portion 53, the hooked concave portion 53 is hooked with the hooking convex portion 24 in the rotation direction R.

The second hooked convex portion 54 may function similarly to the first hooked portion that is hooked with the hooking concave portion 50 in the rotation direction R. The second hooked convex portion 54 protrudes toward the gear 41 along the rotation axis L. The protrusion length of the second hooked convex portion 54 may be equal to the insertion length of the second hooked convex portion 54 into the hooking concave portion 50 when the reinforcing member 43 comes into contact with the rib 47 of the gear 41. The shape of the second hooked convex portion 54 is not limited to a particular shape. For example, the second hooked convex portion 54 may have a shape of a circular arc plate following the outer periphery of the reinforcing member 43. The cross-section of the second hooked convex portion 54 in the rotation direction R may have a shape that surface-contacts the web portion 46 forming the hooking concave portion 50.

The second hooked convex portion 54 may be provided in plurality on a circle around the rotation axis L. Each of the second hooked convex portions 54 may be provided at a position corresponding to the hooking concave portion 50 when the outer periphery contact portion 52 is inserted into the cylinder portion 49.

When the rod portion 23 is inserted into the shaft hole 18, the outer periphery contact portion 52 is inserted into the cylinder portion 49. Accordingly, the radial positions of the gear 41, the rotation shaft 12, and the reinforcing member 43 are determined. Also, the second hooked convex portion 54 is inserted into the hooking concave portion 50 and then hooked with the hooking concave portion 50 in the rotation direction R. Accordingly, the rotation driving force of the gear 41 is transmitted to the rotation shaft 12 through the reinforcing member 43.

In this manner, in an exemplary embodiment, since the second hooked convex portion 54 of the reinforcing member 43 is inserted into the hooking concave portion 50 formed at the web portion 46 of the gear 41, the rotation driving force of the gear 41 is transmitted to the reinforcing member 43. That is, the shaft hole 18 of the gear 41 may not have a function of transmitting the rotation driving force. Accordingly, since the shaft hole 18 may be formed in a shape of a circle, the precision of the gear 41 may be maintained. Also, since the hooking concave portion 50 may be formed at a certain position of the gear 41, the rotation driving force of the gear 41 may be transmitted to the reinforcing member 43 at a position distant from the shaft hole 18. Accordingly, stress on the gear 41 may be reduced.

Also, since a plurality of hooking concave portions 50 are provided on the same radius of the gear 41, stress generated in the gear 41 may be distributed. Also, since the number of hooking concave portions 50 formed on the same radius of the gear 41 may be a common divisor of the number of radial rib portions 22 provided on the same radius as the hooking concave portion 50 and the number of gates for injection-molding the gear 41, the distortion of the gear 41 by thermal contraction during the injection-molding of the gear 41 may be reduced. Accordingly, the gear 41 may be manufactured with high precision.

Also, since the hooking concave portion 50 is located at a radially more inner side than the position of the gate, the molten resin may easily flow into the periphery of the hooking concave portion 50 during the injection-molding of the gear 41. Accordingly, the gear 41 may be manufactured with high precision.

Also, since the hooking convex portion 24 protruding in the direction perpendicular to the rotation axis L of the rotation shaft 12 is inserted into the hooked concave portion 53 of the reinforcing member 43, the rotation driving force of the gear 41 may be securely transmitted to the rotation shaft 12.

Although exemplary embodiments have been described above, the disclosure is not limited to the above exemplary embodiments.

For example, although detailed structures of a first hooking portion, a second hooking portion, a first hooked portion, and a second hooked portion have been illustrated in the above exemplary embodiments, inventive concepts may have any structure in which a first hooking portion and a first hooked portion may be hooked together in a rotation direction R, and a second hooking portion and a second hooked portion may be hooked together in the rotation direction R.

Also, although a position of the reinforcing member has been described as being determined with respect to the gear in the exemplary embodiments, the position of the reinforcing member may also be determined with respect to only the rotation shaft, or with respect to both the gear and the rotation shaft. For example, a through hole may be formed at a center of a reinforcing member, and a rotation shaft may be inserted into the through hole. In such a gear apparatus, since the rotation shaft is inserted into the through hole of the reinforcing member, the position of the reinforcing member with respect to the rotation shaft may be controlled. Accordingly, the total margin of the gear apparatus (i.e., the deviation from the rotation axis L) may be reduced.

Also, in an exemplary embodiment described above, although the rib has been described as including the cylindrical rib portion and the radial rib portion, the rib might not include a cylindrical rib portion. In another exemplary embodiment, although the gear has been described as including the rib, the gear might not include a rib.

Also, the material of the gear is not limited to a resin, and the gear may be formed of other materials such as metal materials.

It should be understood that one or more exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of inventive concepts as defined by the following claims.

What is claimed is:
1. A gear apparatus comprising:
a gear comprising a shaft hole and a gear portion;
a rotation shaft that is inserted into the shaft hole;
a reinforcing member comprising a through hole into which the rotation shaft is inserted, and that has a stiffness that is higher than a stiffness of the gear;
a first receiving portion that is provided at the gear;
a first protruding portion that is provided at the reinforcing member and is configured to be engaged with the first receiving portion in a direction of rotation of the gear, such that the reinforcing member and the gear rotate together;
a second protruding portion that is provided at the rotation shaft; and
a second receiving portion that is provided at the reinforcing member and is configured to be engaged with the second protruding portion in the direction of rotation, such that the reinforcing member and the rotation shaft rotate together, wherein the gear further comprises a boss portion in which the shaft hole is formed, a rim portion in which the gear portion is formed, and a web portion comprising a plurality of radial rib portions, that connects the boss portion and the rim portion, wherein the first receiving portion comprises a radial rib portion, from among the plurality of radial rib portions, that extends radially from the boss portion, and wherein the first protruding portion contacts a radial rib portion in the direction of rotation.

2. The gear apparatus of claim 1, wherein the second protruding portion protrudes in a direction that is perpendicular to a rotation axis of the rotation shaft, and wherein the second receiving portion further comprises a second recess into which the second protruding portion is configured to be inserted.

3. The gear apparatus of claim 1, wherein the reinforcing member is comprised of a sintered metal.

4. The gear apparatus of claim 1, further comprising a position determining portion configured to determine a radial position of the reinforcing member with respect to the gear.

5. The gear apparatus of claim 4, wherein the position determining portion further comprises:

the through hole; and a cylinder portion that is concentric with the shaft hole, is provided at the gear and which protrudes in a rotation axis direction of the rotation shaft, and is inserted into the through hole.

6. The gear apparatus of claim 4, wherein the position determining portion further comprises:

a cylinder portion that is concentric with the shaft hole, is provided at the gear, and is configured to protrude in a rotation axis direction of the rotation shaft, and an outer periphery contact portion that is concentric with the through hole, is provided at the reinforcing member, and is configured to be inserted into the cylinder portion.

7. An image forming apparatus comprising:

the gear apparatus of claim 1;

a photoconductive member in which an electrostatic latent image is formed;

a developer configured to develop the electrostatic latent image; and a transferer configured to transfer a developed image to a recording medium, and wherein at least one of the photoconductive member and the transferer is configured to be driven in connection with the rotation shaft of the gear apparatus.

8. A gear apparatus comprising:

a gear comprising a shaft hole and a gear portion;

a rotation shaft that is inserted into the shaft hole;

a reinforcing member comprising a through hole into which the rotation shaft is inserted, and that has a stiffness that is higher than a stiffness of the gear;

a first receiving portion that is provided at the gear;

a first protruding portion that is provided at the reinforcing member and is configured to be engaged with the first receiving portion in a direction of rotation of the gear, such that the reinforcing member and the gear rotate together;

a second protruding portion that is provided at the rotation shaft; and a second receiving portion that is provided at the reinforcing member and is configured to be engaged with the second protruding portion in the direction of rotation, such that the reinforcing member and the rotation shaft rotate together, wherein the gear further comprises a boss portion in which the shaft hole is formed, a rim portion in which the gear portion is formed, and a web portion, comprising a plurality of radial rib portions, that connects the boss portion and the rim portion, wherein the first receiving portion further comprises a first recess that is formed at the web portion, and wherein the first protruding portion is inserted into the first recess.

9. The gear apparatus of claim 8, wherein the plurality of radial rib portions extend radially from the boss portion, and wherein the first recess comprises a plurality of first recesses at a same radius from the shaft hole.

10. A gear apparatus comprising:

a gear comprising a shaft hole;

a reinforcing member that has a stiffness that is higher than a stiffness of the gear;

a rotation shaft inserted into the shaft hole of the gear through the reinforcing member;

a first connecting portion configured to connect the gear and the reinforcing member such that the gear and the reinforcing member rotate together, and which is provided at a radial circumference of the shaft hole; and a second connecting portion configured to connect the reinforcing member and the rotation shaft such that the reinforcing member and the rotation shaft rotate together, wherein the first connecting portion comprises:

a first receiving portion that is provided at the gear; and a first protruding portion that is provided at the reinforcing member and which is engaged with the first receiving portion in a direction of rotation of the gear such that the reinforcing member and the gear rotate together, wherein the gear comprises a boss portion in which the shaft hole is formed, a rim portion in which a gear portion is formed, and a web portion, comprising a plurality of radial rib portions, that connects the boss portion and the rim portion, wherein the first receiving portion comprises a radial rib portion, from among the plurality of radial rib portions, that extends radially from the boss portion, and wherein the first protruding portion contacts a radial rib portion in the rotation direction.

11. The gear apparatus of claim 10, wherein the reinforcing member comprises a sintered metal.

12. A gear apparatus comprising:

a gear comprising a shaft hole;

a reinforcing member that has a stiffness that is higher than a stiffness of the gear;

a rotation shaft inserted into the shaft hole of the gear through the reinforcing member;

a first connecting portion configured to connect the gear and the reinforcing member such that the gear and the reinforcing member rotate together, and which is provided at a radial circumference of the shaft hole; and a second connecting portion configured to connect the reinforcing member and the rotation shaft such that the reinforcing member and the rotation shaft rotate together, wherein the first connecting portion comprises:
- a first receiving portion that is provided at the gear; and
- a first protruding portion that is provided at the reinforcing member and which is engaged with the first receiving portion in a direction of rotation of the gear such that the reinforcing member and the gear rotate together, wherein the gear comprises a boss portion in which the shaft hole is formed, a rim portion in which a gear portion is formed, and a web portion, comprising a plurality of radial rib portions, that connects the boss portion and the rim portion, wherein the first receiving portion further comprises a first recess that is formed at the web portion, and wherein the first protruding portion is inserted into the first recess.

13. The gear apparatus of claim 12, wherein the plurality of radial rib portions that extend radially from the boss portion, wherein the first recess comprises a plurality of first recesses at a same radius from the shaft hole.

\* \* \* \* \*